(No Model.)

C. A. GIBFORD.
STEAMER FOR COOKING FOOD.

No. 311,306. Patented Jan. 27, 1885.

WITNESSES:

INVENTOR:
Chas. A. Gibford
BY Munn & Co.
ATTORNEYS.

UNITED STATES PATENT OFFICE.

CHARLES A. GIBFORD, OF NEWTON, IOWA.

STEAMER FOR COOKING FOOD.

SPECIFICATION forming part of Letters Patent No. 311,306, dated January 27, 1885.

Application filed September 12, 1884. (No model.)

*To all whom it may concern:*

Be it known that I, CHARLES A. GIBFORD, of Newton, in the county of Jasper and State of Iowa, have invented a new and Improved Steamer for Cooking Food, of which the following is a full, clear, and exact description.

My improvements relate to steamers for the purpose of cooking meats, vegetables, and other articles, the object being to provide a compact apparatus in which several articles can be steamed at once without risk of the odors of any one of the articles affecting the others.

The invention consists in the construction and arrangement of parts, as will be hereinafter fully described and claimed.

Reference is to be had to the accompanying drawings, forming part of this specification, in which similar letters of reference indicate corresponding parts in all the figures.

Figure 1:
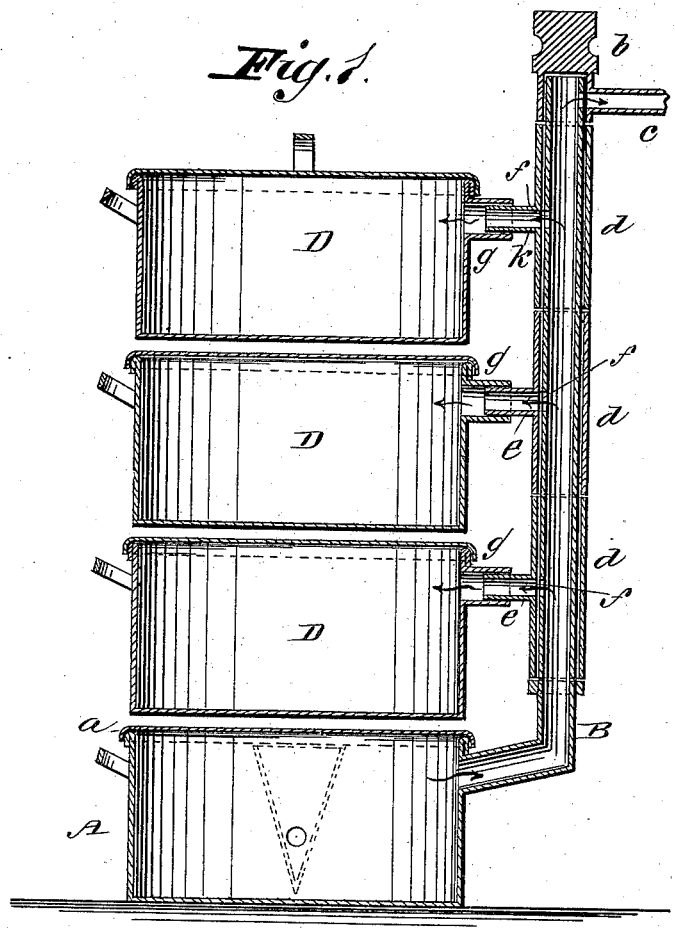
Figure 2:
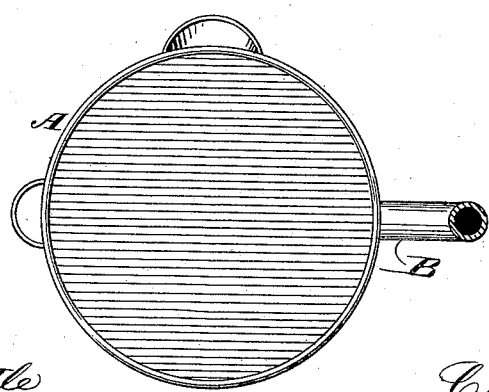

Figure 1 is a longitudinal section of my improved steamer. Fig. 2 is a sectional plan view showing the water-vessel.

The water-vessel A, of suitable size and form, is adapted to be set upon a stove or over a fire in any desired manner, and is provided with a cover, $a$, and also with a steam-pipe, B, which extends out from one side and up vertically to a suitable height. At the upper end of the pipe B is a valve, $b$, made in the form of a ferrule, so as to be turned to bring the escape-pipe $c$ upon the ferrule to register with an opening in the pipe B, so that the escape of steam may be allowed or cut off. Upon the pipe B are a number of short sections of tubing, $d$, fitting loosely, so as to turn freely upon the stand-pipe, and provided with side projecting tubes, $e$, that can be brought in line with openings $f$ in the side of the pipe B by turning the sections $d$.

D are the cooking-vessels, formed with tubular necks $g$ of a size for passing on the projecting tubes $e$ of the sections $d$, whereby the vessels D are supported and will receive steam from the vessel A through the pipe B. There may be any suitable number of the cooking-vessels, each provided with a cover, and the arrangement is such that when the vessels are placed in a tier one above another and above the water-vessel A steam will pass to them all.

One or more of the cooking-vessels may be used at once. The turning tubes $d$ that are not in use will be turned to one side, so as to prevent the escape of steam. When it is desired to inspect or remove the contents of any one of the vessels, it can be turned to one side independent of the others, thereby cutting off the steam, and in this position the cover can be removed, or it may be turned to one side more or less to regulate the supply of steam.

It will be seen that there is no opportunity for the odors from any one of the vessels to enter the others and affect the article being cooked therein.

Having thus described my invention, I claim and desire to secure by Letters Patent—

The combination of the water-vessel A and cooking-vessels D, provided with tubular necks $g$, with the stand-pipe B, and the tubular sections $d$, adapted to turn on the stand-pipe, and having side extensions, $e$, substantially as herein shown and described.

CHARLES A. GIBFORD.

Witnesses:
E. J. SALMON,
E. J. SCHUNEMAN.